: 3,445,481
Patented May 20, 1969

3,445,481
PROCESS FOR THE PREPARATION OF DICARBOXYALKYLIDENE COMPOUNDS CONTAINING HALO SUBSTITUTED BICYCLOALKENE MOIETIES AND DERIVATIVES THEREOF
Louis Schmerling, Riverside, Ill., assignor to Universal Oil Products Company, Des Plaines, Ill., a corporation of Delaware
No Drawing. Filed Aug. 12, 1965, Ser. No. 479,321
Int. Cl. C07d 5/00; C07c 69/00
U.S. Cl. 260—347.3
9 Claims

ABSTRACT OF THE DISCLOSURE

Preparation of dicarboxyalkylidene compounds by condensing an unsaturated ketone with a dicarboxylic acid, anhydride, ester or salt thereof in the presence of a basic catalyst, followed by the condensation of the resultant adduct with a polyhalo substituted alkadiene.

This invention relates to a process for the preparation of compositions of matter comprising dicarboxyalkylidene compounds and derivatives thereof which possess certain substituted moieties thereon. More specifically, the invention relates to a process for preparing dicarboxyalkylidene compounds containing two polyhalo substituted bicycloalkene moieties as well as derivatives thereof.

The increased use of certain polymeric compositions of matter, either naturally occurring or synthetic in origin such as resins, plastics, textiles including rayon, nylon, polyesters, etc., wool, leather cotton, etc., or other cellulose products such as paper, in situations where the finished article is normally subject to excessive heat or the possibility of contact with an open flame, necessitates the advisability of having these articles possess the capabilities of being able to withstand the aforementioned effects of heat and/or flame. For example, in recent years, plastics or resins when molded or formed, may be used as receptacles for electrical contacts, electrical appliances and equipment, for architectural paneling and bodies for airplanes, cars, boats, etc., as insulation, etc., and in other places where the possibility of contact with an open flame is present. It is therefore desirable that the finished product, either resin, plastics, etc., should possess the desirable physical characteristics of being resistant to flame and retardant to the action of the flame thereon. In order to render the article of commerce resistant or retardant to flame, the article should contain, either as an element thereof or by impregnation therewith some compound which will impart the aforesaid property of flame retardancy or flame resistance to the specific article. In this respect, it has been found that certain compositions of matter which are prepared according to the process which comprises the present invention will, when added to certain polymeric substances, impart the desirable property of flame resistance or flame retardance to the aforementioned substances. In addition, it is also contemplated that the compositions of matter which are prepared in a manner hereinafter set forth in greater detail may also be utilized as insecticides and in the preparation of other chemical compounds including pharmaceuticals, etc.

In view of this, it is therefore an object of this invention to provide a process for the preparation of certain compositions of matter which will impart desirable characteristics such as flame retardancy to plastics, resins or other polymeric substances.

A further object of this invention is to provide a process for the preparation of compositions of matter which contain polyhalo substituted bicycloalkene moieties, said substituents providing desirable characteristics when utilized in the preparation of finished compositions of matter such as plastics, resins, etc.

In a broad aspect, one embodiment of this invention resides in a process for the preparation of a compound selected from the group consisting of dicarboxyalkylidene compounds containing two polyhalo substituted bicycloalkene moieties and anhydrides, esters and salts thereof which comprises condensing an unsaturated ketone with a compound selected from the group consisting of dicarboxylic acids, anhydrides, esters and salts thereof at condensation conditions in the presence of a basic catalyst, thereafter further condensing the resultant adduct with a polyhalo substituted alkadiene at condensation conditions, and recovering the resultant compound.

A further embodiment of this invention is found in a process for the preparation of a compound selected from the group consisting of dicarboxyalkylidene compounds containing two polyhalo substituted bicycloalkene moieties and anhydrides, esters and salts thereof which comprises condensing an unsaturated ketone with a compound selected from the group consisting of dicarboxylic acids, anhydrides, esters and salts thereof at a temperature in the range of from ambient to about 150° C. and at a pressure of from about atmospheric to about 50 atmospheres in the presence of a basic catalyst, thereafter further condensing the resultant adduct with a polychloro substituted alkadiene at a temperature in the range of from about 50° to about 150° C. and at a pressure in the range of from about atmospheric to about 50 atmospheres, and recovering the resultant compound.

A specific embodiment of this invention is found in a process which comprises condensing quinone with dimethyl glutarate at a temperature in the range of from ambient to about 150° C. and at a pressure in the range of from atmospheric to about 50 atmospheres in the presence of pyridine, thereafter further condensing one molecular proportion of the resultant 3,6-bis[(carbomethoxy) - (carbomethoxyethyl)methylene] - 1,4-cyclohexadiene with two molecular proportions of hexachlorocyclopentadiene at a temperature in the range of from about 50° to about 150° C. and at a pressure in the range of from atmospheric to about 50 atmospheres, and recovering the resultant tetramethyl 1,2,3,4,5,6,7,8,11,11, 12,12 - dodecachloro-1,4,4a,5,8,8a,9,9a,10,10a-decahydro-1,4,5,8 - dimethano - 9,10 - anthracenediylidene - 2,2'-diglutarate.

Other objects and embodiments will be found in the following further detailed description of this invention.

As hereinbefore set forth, the present invention relates to a process for the preparation of compositions of matter which will impart desirable characteristics to polymeric products. These compositions of matter which comprise dicarboxyalkylidene compounds containing two polyhalo substituted bicycloalkene moieties as well as anhydrides, esters and salts thereof are prepared by condensing an unsaturated ketone which may be referred to as a dienone with a dibasic acid, anhydride, ester or salt thereof which contains at least two active hydrogen atoms, and thereafter further condensing the resultant adduct with a polyhalo substituted alkadiene. For purposes of the present invention the term "alkadiene" as used in the present specification and appended claims will refer to both open-chain and cyclic dienic compounds. Likewise, the term "cycloalkene" as used in the present specification and appended claims will refer to both mono- and polycyclic alkenes.

Suitable dienic ketones which may be utilized include divinyl ketone, diallyl ketone, diallylacetone, crotylidenacetone (2,4-heptadien-6-one), cyclopentadienone, quinone, etc. Suitable dibasic acids, anhydrides, esters or salts thereof which contain at least two active hydrogen atoms (usually on a carbon atom in an alpha position to a carboxy group) which may be condensed with the aforementioned ketones in a manner hereinafter set forth in greater detail include malonic acid, dimethyl malonate, diethyl malonate, succinic acid, succinic anhydride, dimethyl succinate, diethyl succinate, glutaric acid, dimethyl glutarate, diethyl glutarate, adipic acid, dimethyl adipate, diethyl adipate, pimelic acid, dimethyl pimelate, diethyl pimelate, suberic acid, dimethyl suberate, diethyl suberate, azelaic acid, dimethyl azelate, diethyl azelate, sebacic acid, dimethyl sebacate, diethyl sebacate, sodium succinate, potassium glutarate, sodium sebacate, etc. It is to be understood that the aforementioned unsaturated ketones and the dibasic acids, anhydrides, esters and salts thereof are only representative of the class of compounds which may be used and that the present invention is not necessarily limited thereto.

The condensation process between the ketone and the dicarboxylic acid, anhydride, ester or salt thereof is effected at condensation conditions which may include a temperature in the range of from about ambient (25° C.) to about 150° C. and at pressures ranging from about atmospheric to about 50 atmospheres or more, the pressure which is used being dependent upon the compounds undergoing condensation and is sufficient to maintain the reactants in a liquid phase. In addition, the condensation is effected in the presence of a basic catalyst. Examples of these catalysts which may be used include sodium hydroxide, potassium carbonate, lithium carbonate, sodamide, sodium methoxide, potassium t-butoxide, etc., as well as organic basic compounds such as dimethylamine, triethylamine, tripropylamine, piperidine, pyridine, β-alanine, etc.

The resultant condensation product is then further condensed with a conjugated halo substituted cycloalkadiene in which the preferred halogen substituent comprises chlorine or bromine. Halo substituted cyclodienic compounds which may be used, said compounds containing only carbon, hydrogen and halogen atoms, possess the generic formula:

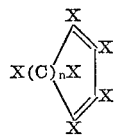

in which the X's are independently selected from the group consisting of hydrogen or halogen radicals having an atomic weight of from 35 to 80 (i.e. chlorine or bromine), at least two of the X's being halogen and $n$ is an integer of from 1 to 2. Representative compounds include 1,2 - dichlorocyclopentadiene, 1,2,3-trichlorocyclopentadiene, 1,2,3,4-tetrachlorocyclopentadiene, 1,2,3,4,5-pentachlorocyclopentadiene, hexachlorocyclopentadiene, 1,2,3,4-tetrabromocyclopentadiene, 1,2,3,4,5-pentabromocyclopentadiene. It is also contemplated that polyhalo substituted conjugated cyclohexadienes such as 1,2-dichloro-1,3-cyclohexadiene, 1,2,3-trichloro-1,3-cyclohexadiene, octachloro-1,3-cyclohexadiene, 1,2-dibromo-1,3-cyclohexadiene, 1,2,3-tribromo-1,3-cyclohexadiene, octabromo-1,3-cyclohexadiene, etc., or polyhalo substituted cycloalkadienes which may contain more than one species of halo substituents such as for example, 1-chloro-2-bromocyclopentadiene, 1,2-dichloro-3-bromocyclopentadiene, 1,2-dichloro-5,5-dibromocyclopentadiene, etc., may also be used. It is also contemplated within the scope of this invention that polyhalo substituted open-chain alkadienes such as 1,4-dichloro-1,3-butadiene, 1,1,4,4-tetrachloro-1,3-butadiene, 1,4 - dibromo-1,3-butadiene, 1,5-dichloro-1,3-pentadiene, etc., may also be condensed with the adduct although not necessarily with equivalent results. In addition, it is also further contemplated that a conjugated alkadiene such as 1,3-butadiene, 1,3-pentadiene, 2,4-pentadiene, etc., may be condensed with the adduct resulting from the condensation between the ketone and the dibasic compound and thereafter further condensing this adduct with a polyhalo substituted cycloalkadiene or alkadiene to prepare dicarboxyalkylidene compounds containing two polyhalo substituted tricycloalkene moieties.

The condensation between the polyhalo substituted alkadiene and the adduct resulting from the condensation of the unsaturated ketone and the diabasic compound is effected at temperatures ranging from about 50° to about 200° C. and at a pressure ranging from about atmospheric to about 50 atmospheres or more, the amount of pressure again being that which is required to maintain a major portion of the reactants in the liquid phase. If so desired, this condensation may take place in an inert organic solvent, examples of said solvents including aromatic hydrocarbons such as benzene, toluene, o-xylene, m-xylene, p-xylene, ethylbenzene, etc., straight chain and cyclic paraffins such as n-pentane, n-hexane, n-heptane, cyclopentane, methylcyclopentane, cyclohexane, etc. In addition, the polyhalo substituted cycloalkadiene is present in the condensation reaction in a mole ratio of two moles of conjugated polyhalo substituted cycloalkadienes per mole of the product of condensation and the unsaturated ketone and the dibasic acid, anhydride, ester or salt thereof.

The process of the present invention may be effected in any suitable manner and may comprise either a batch or continuous type operation. For example, when a batch type operation is used, a quantity of the dienic ketone and the dibasic acid, anhydride, ester or salt thereof is placed in an appropriate apparatus, preferably a condensation vessel, when it is maintained at the proper operating conditions of temperature and pressure. The vessel will also contain a basic catalyst and, if so desired, a substantially inert organic solvent such as for example, methyl alcohol, ethyl alcohol, isopropyl alcohol, benzene, toluene, etc. The condensation is allowed to proceed for a predetermined period of time while the water formed during the reaction is, if desired, azeotroped off by means of a suitable apparatus. At the end of the residence time, the condensation product is recovered by conventional means after separation from the solvent, the catalyst and any unreacted starting materials which may still be present. The thus formed adduct is then placed in a second reaction vessel along with the polyhalo substituted alkadiene in a mole ratio of one molecular proportion of adduct per two molecular proportions of polyhalo substituted alkadiene. A substantially inert solvent such as benzene, toluene, the xylenes, etc., may also be placed in the reaction vessel which is thereafter heated to the desired operating temperature, usually the reflux temperature of the solvent which is employed. At the end of the desired residence time, the vessel and contents thereof are allowed to cool to room temperature, and the desired reaction product is separated from the solvent and unreacted starting materials by conventional means which may include fractional distillation under reduced pressure, fractional crystallization, etc.

It is also contemplated within the scope of this invention that the process may be effected in a continuous manner. When such a type of operation is used, the starting materials comprising the dienic ketone and the dibasic acid, anhydride, ester or salt thereof are continuously charged to a reaction vessel which is maintained at the proper operating conditions of temperature and pressure. The vessel will also contain a basic catalyst of the type hereinbefore set forth or such a catalyst may be passed thereto. If so desired, an organic solvent such as a lower alkyl alcohol or aromatic hydrocarbon may also be charged to the reactor through a separate line or admixed with one or both of the starting materials prior to entry into said reactor. Upon completion of the desired operating time the reactor effluent is continuously withdrawn, the desired condensation adduct being separated by conventional means from any solvent, water and unreacted starting materials being recycled to form a portion of the feed stock. The desired adduct which is recovered is then continuously charged to a second reaction, also maintained at the proper operating conditions of temperature and pressure. In addition, the polyhalo substituted alkadiene is continuously charged to this second reaction zone along with an organic solvent in a mole ratio of two molecular proportions of polyhalo substituted alkadiene per molecular proportion of condensation adduct. After completion of the desired residence time, the reactor effluent from the second reaction zone is continuously withdrawn and separated from any unreacted starting materials or solvent. The desired product is recovered by conventional means similar to those hereinbefore set forth and charged to storage, while the unreacted starting materials which have been separated therefrom may be recycled to form a portion of the feed stock in the second reaction zone.

Examples of compounds which may be prepared according to the process of this invention include tetramethyl 1,2,3,4,5,6,7,8,11,11,12,12-dodecachloro-
1,4,4a,5,8,8a,9,9a,10,10a-decahydro-1,4,5,8-
dimethano-9,10-anthracenediylidenedimalonate,
tetraethyl 1,2,3,4,5,6,7,8,11,11,12,12-dodecachloro-
1,4,4a,5,8,8a,9,9a,10,10a-decahydro-1,4,5,8-
dimethano-9,10-anthracenediylidenedimalonate,
tetramethyl 1,2,3,4,5,6,7,8,11,11,12,12-dodecachloro-
1,4,4a,5,8,8a,9,9a,10,10a-decahydro-1,4,5,8-
dimethano-9,10-anthracenediylidene-2,2'-diglutarate,
tetraethyl 1,2,3,4,5,6,7,8,11,11,12,12-dodecachloro-
1,4,4a,5,8,8a,9,9a,10,10a-decahydro-1,4,5,8-
dimethano-9,10-anthracenediylidene-2,2'-diglutarate,
tetramethyl 1,2,3,4,5,6,7,8,11,11,12,12-dodecachloro-
1,4,4a,5,8,8a,9,9a,10,10a-decahydro-1,4,5,8-
dimethano-9,10-anthracenediylidene-2,2'-disuccinate,
2-[bis(1,4,5,6,7,7-hexachloro-5-norbornen-2-
yl)methylene]glutaric acid,
2-[bis(1,4,5,6,7,7-hexachloro-5-norbornen-2-
ylmethyl)methylene]glutaric acid,
2-[bis(1,4,5,6,7,7-hexachloro-5-norbornen-2-
yl)methylene]succinic acid,
2-[bis(1,4,5,6,7,7-hexachloro-5-norbornen-2-
ylmethyl)methylene]succinic acid,
2-[1,2,3,4,5,6,7,8,10,10,11,11-dodecachloro-
1,4,4a,4b,5,8,8a,9a-octahydro-1,4,5,8-dimethano-
9-fluorenylidene]succinic anhydride,
2-[1,2,3,4,5,6,7,8,10,10,11,11-dodecabromo-
1,4,4a,4b,5,8,8a,9a-octahydro-1,4,5,8-dimethano-
9-fluorenylidene]succinic anhydride,
tetramethyl 1,2,3,4,5,6,7,8,11,11,12,12-dodecabromo-
1,4,4a,5,8,8a,9,9a,10,10a-decahydro-1,4,5,8-
dimethano-9,10-anthracenediylidenedimalonate,
tetramethyl 1,2,3,4,5,6,7,8,11,11,12,12-dodecabromo-
1,4,4a,5,8,8a,9,9a,10,10a-decahydro-1,4,5,8-
dimethano-9,10-anthracenediylidene-2,2'-diglutarate,
tetramethyl 1,2,3,4,5,6,7,8,11,11,12,12-dodecabromo-
1,4,4a,5,8,8a,9,9a,10,10a-decahydro-1,4,5,8-
dimethano-9,10-anthracenediylidene-2,2'-disuccinate,
2-[bis(1,4,5,6,7,7-hexabromo-5-norbornen-2-
ylmethyl)methylene]glutaric acid,
2-[bis(1,4,5,6,7,7-hexabromo-5-norbornen-2-
ylmethyl)methylene]succinic acid.

It is to be understood that the aforementioned compounds are only representative of the compositions of matter which may be prepared according to the process herein described and that the present invention is not necessarily limited thereto.

As hereinbefore set forth, the aforementioned dicarboxyalklidene compounds containing two polyhalo substituted bicycloalkene moieties as well as the anhydride, ester or salt thereof are reacted with certain polymeric compositions of matter containing at least one reactive functional group. One example of these polymeric products comprises epoxy resins which may be cured by the addition of the aforementioned compounds. The resins in an uncured state are thermoplastic and may range from low viscosity liquids to high melting point brittle solids. A specific example of an epoxy resin is the condensation product of epichlorohydrin and bis-phenol. The aforementioned dicarboxy compound will react with the epoxy resin by condensing with the reactive epoxy or oxirane group present in the molecules to form cross-linked tri-dimensional structures. By utilizing the particular dicarboxyalkylidene compounds, the resultant product will be stable in regard to color, said stability being to particular advantage when utilizing the resins for certain specific purposes, for example, floor surfacing, coatings, etc.

Another polymeric product which may be reacted with the compound prepared according to the process of the present invention comprises the polyurethanes which are prepared from the prepolymers in which the reactive functional group is an isocyanate end group. The prepolymer will be a linear low molecular weight product which is cured by reaction with the dicarboxyalkylidene compound, said curing resulting in the cross-linking or chain extension of the polymer to give higher molecular weight compounds. These compounds may be prepared in foam-form by incorporating a foaming agent such as water, alcohol, etc., during the curing step, the final product then possessing the desired physical properties of the type hereinbefore set forth, that is, a high stability as regards color changes due to deterioration and a resistance to flame. In addition to be used as a foam, the urethanes may be used as coatings, said coatings having desirable characteristics such as being fast drying, possessing a hard surface, deep gloss, a high resistance to abrasion and weathering, as well as an excellent resistance to fire.

Other prepolymers possessing an excess of at least one reactive functional group which may be reacted with the dicarboxyalkylidene compound containing two polyhalo substituted bicycloalkene moieties or the anhydride, ester or salt thereof comprise polyamides which are prepared by condensing a polyamine with a dibasic acid and thereafter cross-linking the condensation product with the dicarboxy compound. The resulting cured or cross-linked polyamide may then be used for molding resins, films, coatings, insulations, etc.

Yet another type of prepolymer which may be cured or cross-linked by use of a dicarboxy compound prepared according to the process of this invention are polyesters which have been formed by the reaction of an unsaturated dicarboxylic acid with a polyhydroxy compound. The polyesters and polyamides which have been cross-linked with the dicarboxyalkylidene compound containing two polyhalo substituted bicycloalkene moieties, the anhydride, ester or salt thereof will also possess the desirable characteristics of being flame resistant and also being resistant to color changes.

The prepolymers of the type hereinbefore set forth which contain an excess of at least one reactive functional group and the dicarboxy compound prepared according to the process of this invention will be reacted in any manner known in the art, the reaction conditions such as temperature and pressure being dependent upon the particular compounds undergoing curing or cross-linking. Usually the cross-linking or curing of the prepolymer with the particular compound will be effected at a temperature ranging from ambient (about 25° C.) up to about 300° C., or more. In addition, the dicarboxy compound will be present in the finished reaction product in various concentrations ranging from about 5% to about 50% or more of the finished product, the particular concentration again being dependent upon the particular use to which the finished polymeric product will be put.

The following examples are given to illustrate the process of the present invention which, however, are not intended to limit the generally broad scope of the present invention in strict accordance therewith.

Example I

In this example, a mixture of 108 g. (1.0 mole) of quinone and 160 g. (1.0 mole) of diethyl malonate is dissolved in 200 cc. of methyl alcohol and placed in a condensation flask. In addition, 15 cc. of piperidine and 150 cc. of benzene are also added thereto. The solution is then heated under reflux for a period of about six hours after which the flask and contents thereof are allowed to cool to room temperature. The desired 3,6-bis-(dicarbethoxymethylene)-1,4-cyclohexadiene is separated from the solvent and recovered.

The desired product is then prepared by placing a mixture of 273 g. (1.0 mole) of hexachlorocyclopentadiene and 117 g. (0.5 mole) of the substituted 1,4-cyclohexadiene prepared according to the above paragraph in a condensation flask along with 200 cc. of xylene. The flask is then heated to reflux and maintained thereat for a period of about four hours. At the end of this time, the solvent is flashed off and the reaction product is subjected to fractional crystallization. The desired product comprising tetraethyl 1,2,3,4,5,6,7,8,11,11,12,12-hexachloro-1,4,4a,5,8,8a,9,9a,10,10a - decahydro - 1,4,5,8-dimethano-9,10-anthracenediylidenedimalonate is separated and recovered.

Example II

In this experiment, a mixture of 108 g. (1.0 mole) of quinone and 160 g. (1.0 mole) of dimethyl glutarate is dissolved in 200 cc. of ethyl alcohol and placed in a condensation apparatus along with 30 g. of pyridine. The apparatus and contents thereof are heated under reflux for a period of about eight hours. At the end of this time, the flask and contents thereof are allowed to cool to room temperature and the reaction mixture subjected to fractional distillation, the desired 3,6-[bis-(carbomethoxy)-(2 - carbomethoxyethyl)methylene] - 1,4 - cyclohexadiene being recovered. Following this, two molecular proportions of hexachlorocyclopentadiene (273 g.) and one molecular proportion (117 g.) of the substituted 1,4-cyclohexadiene are placed in a condensation flask along with 150 cc. of xylene. The flask is heated to the reflux temperature of xylene and maintained thereat for a period of about four hours. At the end of this time, the solvent is flashed off and the desired product comprising tetramethyl 1,2,3,4,5,6,7,8,11,11,12,12-hexachloro-1,4,4a,5,8,8a,9,9a,10,10a - decahydro - 1,4,5,8 - dimethano - 9,10-anthracenediylidene-2,2'-diglutarate is recovered.

If the acid rather than the ester is the desired product, it may be prepared either directly from glutaric acid or by saponifying the ester obtained as described in this example.

Example III

In this example, 110 g. (1.0 mole) of diallyl ketone and 132 g. (1.0 mole) of diethyl glutarate are dissolved in 100 cc. of benzene and placed in a condensation apparatus along with 2 g. of β-alanine. The flask which is fitted with a condenser equipped with a trap for collecting water is heated to reflux and maintained thereat for a period of about eight hours or until water is no longer collected in the trap. At the end of this time, the solvent is flashed off and the desired diethyl 2-(diallyl)-(methylene)glutarate is recovered.

To obtain the desired product, 273 g. (1.0 mole) of hexachlorocyclopentadiene and 147 g. (0.5 mole) of the ethyl 2-(diallylmethylene)glutarate which is a mole ratio of two molecular proportions of hexachlorocyclopentadiene per one molecular proportion of the substituted glutarate are dissolved in 150 cc. of toluene and thereafter placed in a condensation flask. The flask is heated to the reflux temperature of the toluene and maintained thereat for a period of about four hours, at the end of which time the flask and temperature are allowed to cool to room temperature. After flashing off the solvent, the desired reaction product comprising diethyl 2-[bis-(1,4,5,6,7,7- hexachloro - 5 - norbornen - 2 - ylmethyl)methylene]glutarate is separated and recovered.

Example IV

A mixture of 82 g. (1.0 mole) of divinyl ketone and 132 g. (1.0 mole) of glutaric acid are dissolved in 200 cc. of methyl alcohol and placed in a condensation flask along with 50 cc. of pyridine. The flask and contents thereof are then heated to the reflux temperature and maintained thereat for eight hours. At the end of this time, the flask and contents thereof are allowed to cool to room temperature and the intermediate product comprising 2-(divinylmethylene)glutaric acid is separated and recovered.

The final product is prepared by placing a mixture of two molecular proportions of hexachlorocyclopentadiene and one molecular proportion of the 2-(divinylmethylene) glutaric acid in a condensation flask along with 100 cc. of benzene. The flask is heated to reflux temperature and maintained thereat for a period of four hours. At the end of this time, the flask and contents thereof are cooled to room temperature and the desired product comprising 2 - [bis - (1,4,5,6,7,7 - hexachloro - 5 - norbornen - 2 - yl) methylene]glutaric acid is recovered by conventional means.

Example V

A mixture of 80 g. (1.0 mole) of cyclopentadienone and 100 g. (0.1 mole) of succinic anhydride dissolved in 100 cc. of benzene is placed in a condensation apparatus in a manner similar to that hereinbefore set forth and upon completion of the desired residence time, the resultant cyclopentadienylidene succinic anhydride is separated and recovered.

The desired product is then obtained by condensing 270 g. (0.5 mole) of hexabromocyclopentadiene and 44 g. (0.25 mole) of the anhydride in 200 cc. of xylene in a flask heated to the reflux temperature of xylene for a period of about 4 hours. At the end of the desired residence time, the solvent is flashed off and the desired product comprising 2-[1,2,3,4,5,6,7,8,10,10,11,11-dodecabromo - 1,4,4a,4b,5,8,8a,9a - octahydro - 1,4,5,8 - dimethano-9-fluorenylidene]succinic anhydride is separated and recovered.

I claim as my invention:

1. A process which comprises condensing a diolefinic ketone containing up to about 9 carbon atoms with a compound selected from the group consisting of dicarboxylic acids containing up to about 10 carbon atoms, anhydrides, lower alkyl esters and alkali metal salts thereof containing at least two active hydrogen atoms on a carbon atom in alpha position to a carboxy group at condensation conditions in the presence of a basic catalyst selected from the group consisting of alkali metal bases and organic nitrogen bases, and thereafter further condensing one mole proportion of the resultant alkylidene adduct at condensation conditions with two mole proportions of a polyhalo substituted alkadiene having the formula:

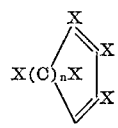

in which the X's are hydrogen or halogen selected from the group consisting of chlorine and bromine, at least two of the X's being halogen, and $n$ is an integer of from 1 to 2, and recovering the resultant condensation product.

2. The process of claim 1 further characterized in that the first-mentioned condensation is effected at a temperature of from ambient to about 150° C. and a pressure of from about atmospheric to about 50 atmospheres and in that the second-mentioned condensation is effected at a temperature of from about 50° to about 200° C. and at a pressure of from about atmospheric to about 50 atmospheres.

3. The process of claim 1 further characterized in that the halogen of said polyhalo substituted alkadiene is chlorine.

4. The process of claim 1 further characterized in that the halogen of said polyhalo substituted alkadiene is bromine.

5. A process which comprises condensing quinone with diethyl malonate at a temperature in the range of from ambient to about 150° C. and at a pressure in the range of from atmospheric to about 50 atmospheres in the presence of piperidine, thereafter further condensing one molecular proportion of the resultant 3,6-bis-(dicarbethoxymethylene)-1,4-cyclohexadiene with two molecular proportions of hexachlorocyclopentadiene at a temperature in the range of from about 50° to about 200° C. and at a pressure in the range of from atmospheric to about 50 atmospheres, and recovering the resultant tetraethyl 1,2,3,4,5,6,7,8,11,11,12,12-dodecachloro-1,4,4a,5,8,-8a,9,9a,10,10a - decahydro-1,4,5,8-dimethano-9,10-anthracenediylidenedimalonate.

6. A process which comprises condensing quinone with diethyl glutarate at a temperature in the range of from ambient to about 150° C. and at a pressure in the range of from atmospheric to about 50 atmospheres in the presence of pyridine, thereafter further condensing one molecular proportion of the resultant 3,6-bis-[(carbomethoxy)-(carbomethoxyethyl)methylene]-1,4-cyclohexadiene with two molecular proportions of hexachlorocyclopentadiene at a temperature in the range of from about 50° to about 200° C. and at a pressure in the range of from atmospheric to about 50 atmospheres, and recovering the resultant tetramethyl 1,2,3,4,5,6,7,8,11,11,12,12-dodecachloro-1,4,4a,5,8,8a,9,9a,10,10a-decahydro - 1,4,5,8 - dimethano-9,10-anthracenediylidene-2,2'-diglutarate.

7. A process which comprises condensing diallyl ketone with diethylglutarate at a temperature in the range of from ambient to about 150° C. and at a pressure in the range of from atmospheric to about 50 atmospheres in the presence of β-alanine, thereafter further condensing one molecular proportion of the resultant diethyl 2-(diallylmethylene)glutarate with two molecular proportions of hexachlorocyclopentadiene at a temperature in the range of from about 50° to about 200° C. and at a pressure in the range of from atmospheric to about 50 atmospheres, and recovering the resultant diethyl 2-[bis-(1,4,5,6,7,7 - hexachloro-5-norbornen-2-ylmethyl)methylene]glutarate.

8. A process which comprises condensing divinyl ketone with glutaric acid at a temperature in the range of from ambient to about 150° C. and at a pressure in the range of from atmospheric to about 50 atmospheres in the presence of pyridine, thereafter further condensing one molecular proportion of the resultant 2-(divinylmethylene)glutaric acid with two molecular proportions of hexachlorocyclopentadiene at a temperature in the range of from about 50° to about 200° C. and at a pressure in the range of from atmospheric to about 50 atmospheres, and recovering the resultant 2-[bis-(1,4,5,6,7,7-hexachloro-5-norbornen-2-yl)methylene]glutaric acid.

9. A process which comprises condensing cyclopentadienone with succinic anhydride at a temperature in the range of from ambient to about 150° C. and at a pressure in the range of from atmospheric to about 50 atmospheres in the presence of pyridine, thereafter further condensing one molecular proportion of the resultant cyclopentadienylidenesuccinic anhydride with two molecular proportions of hexabromocyclopentadiene at a temperature in the range of from about 50° to about 150° C. and at a pressure in the range of from atmospheric to about 50 atmospheres, and recovering the resultant 2-[1,-2,3,4,5,6,7,8,10,10,11,11-dodecabromo - 1,4,4a,4b,5,8,8a,-9a-octahydro-1,4,5,8-dimethano-9-fluorenylidene] succinic anhydride.

References Cited

Sauer et al.: Angew Chem. vol. 74, p. 353 (1962).

ALEX MAZEL, *Primary Examiner.*

BERNARD J. DENTZ, *Assistant Examiner.*

U.S. Cl. X.R.

260—468, 514